D. S. Bigler & W. McCracken.
Mach. for Cleaning Stables.

Nº 88119. Patented Mar. 23, 1869

Witnesses
Jno. A. Ellis
P. Alexander

Inventors
D. S. Bigler & W. McCracken
Per T. H. Alexander
Atty

DANIEL S. BIGLER AND WILLIAM N. McCRACKEN, OF MONAGHAN TOWNSHIP, PENNSYLVANIA.

Letters Patent No. 88,119, dated March 23, 1869.

IMPROVEMENT IN MACHINE FOR CLEANING STABLES.

The Schedule referred to in these Letters Patent and making part of the same.

*To all whom it may concern:*

Be it known that we, DANIEL S. BIGLER and WILLIAM N. McCRACKEN, of Monaghan township, in the county of York, and State of Pennsylvania, have invented certain new and useful Improvements in Stable-Cleaning; and we do hereby declare that the following is a full, clear, and exact description thereof, reference being had to the accompanying drawings, and to the letters of reference marked thereon, which form a part of this specification, in which—

The nature of our invention consists in the constructing of a machine for removing the manure from stables; and to this end, we have two frames, the upper one having its end secured inside of the lower one.

Our invention further consists in having the whiffle-tree linked to both frames, in the manner hereinafter described, and in having the bar to which the fork and the operating-bars are attached, pivoted to the inner frame; and also in providing guards for the ends of the axle, for the purpose hereinafter described.

A and B represent two frames, curved at one end, similar to the runners of a sleigh.

Figure 1:
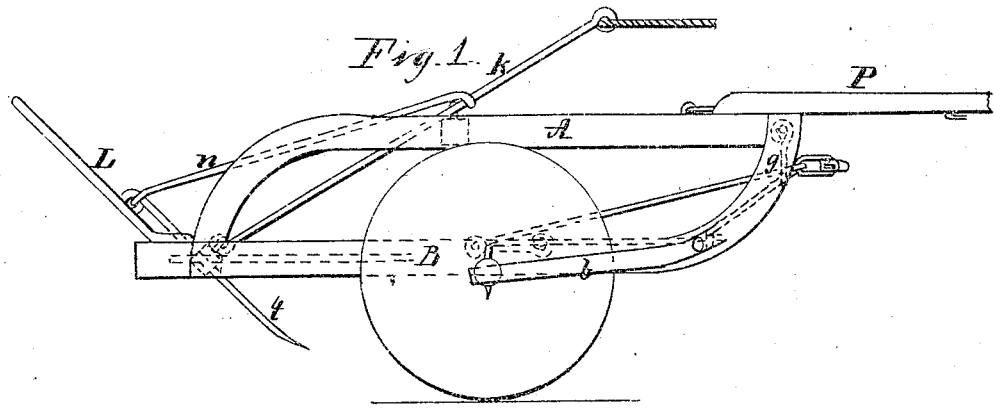
Figure 1 represents a side view of our machine.
Figure 2:
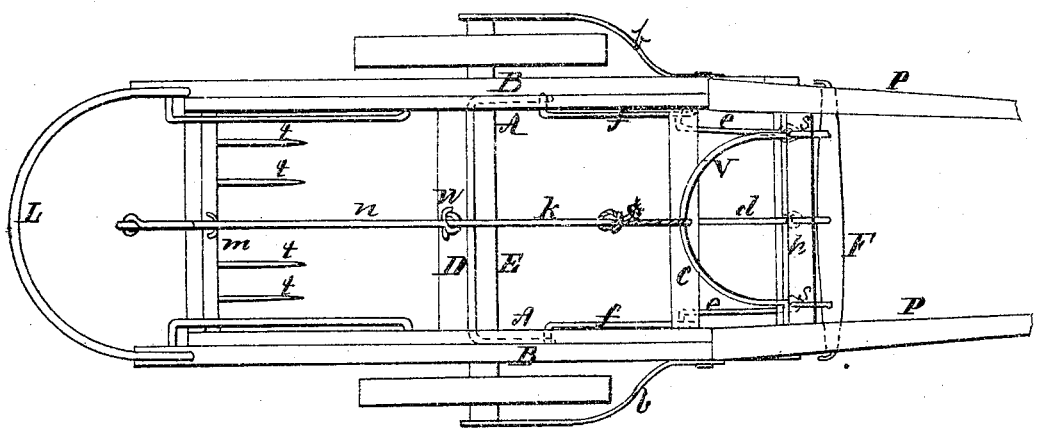
Figure 2 is a plan view of the same.

The curved end of A is secured to the straight end of B, and the straight end of A, to the curved end of B. (See fig. 1.)

The frame is strengthened by the cross-bars C and D, and the frame B is held fast by being bolted to the axle-tree E.

To the bar C, the shafts P P are attached, by means of a semicircular rod, $v$, which passes through an eye in cross-bar C.

The design of this mode of attaching the shafts, is to fold them back, and dispense with horse-power in operating the machine.

$e\ e$ designate two rods, one end of which is looped around its corresponding staple $f$, the staple $f$ being driven in the inner side of frame B.

The outer ends of rods $e\ e$ are linked to two clevises $s\ s$, passing through whiffle-tree F.

The rods $e\ e$ are supported, near their outer ends, by the twisted link $g$.

The middle of the whiffle-tree is supported by the metal rod $d$, the rod $d$ being linked to a clevis in the whiffle-tree F, and also to the bar $h$.

$k$ represents an iron rod, having its lower end linked to a staple on the inner side of bar $m$; the said bar being pivoted at the lower ends of frame C.

The upper side of bar $m$ is furnished with a loop at top, through which the rod $n$ is made to pass. The upper end of rod $n$ is looped around rod $k$, in such a manner as to allow $k$ to play freely backward and forward.

L designates a semicircular rod, the ends of which are fastened to the two sides of frame B.

Through an eye at the upper end of rod $k$, a cord is passed, by which the fork-head $m$ is operated.

The fork-head $m$ is supplied with prongs $t$, slightly curved upward.

$b\ b$ represent the guards, one of which is fastened at one end to the frame B, and then bent so their outer end will cover the ends of the axle E, thus preventing the ends from catching between the boards of a stall, when the machine is in operation.

It will be remarked that when the teeth $t$ are in a vertical position, for the purpose of scraping up the manure, the rod $n$ will stand upright, but will be moved downward, and placed under the hook $w$, when the manure is to be removed.

Having thus described our machine,

What we claim, and desire to secure by Letters Patent, is—

1. The combination of frames A and B, when constructed as and for the purpose specified.

2. The frame A, in combination with rake-head $m$, rods $n$ and $k$, the whole constructed and operating in the manner substantially as described.

3. The shafts P P, when combined with cross-bar C, and operated in the manner described.

4. The guards $b\ b$, in combination with frame B and axle E, in the manner and for the purpose substantially as set forth.

5. The whiffle-tree F, when linked to the bar $h$, in the manner and for the purpose substantially as described.

In testimony that we claim the foregoing as our own, we affix our signatures, in presence of two witnesses.

DANIEL S. BIGLER.
WILLIAM N. McCRACKEN.

Witnesses:
EMANUEL MYERS,
S. N. BAILEY.